United States Patent [19]

Yamanaka et al.

[11] Patent Number: 4,914,611

[45] Date of Patent: Apr. 3, 1990

[54] FORCE MEASURING DEVICE

[75] Inventors: Masami Yamanaka, Miki; Shinichi Inoue, Kobe, both of Japan

[73] Assignee: Yamato Scale Company, Limited, Akashi, Japan

[21] Appl. No.: 57,534

[22] Filed: Jun. 1, 1987

[30] Foreign Application Priority Data

Jun. 13, 1986 [JP] Japan .................................. 61-139039

[51] Int. Cl.⁴ ........................ G01G 3/18; G01G 23/48
[52] U.S. Cl. .................................. 364/567; 364/557;
177/25.12; 177/25.13
[58] Field of Search ............... 364/567, 568, 557, 558;
177/25.11, 25.12, 25.13, 25.14

[56] References Cited

U.S. PATENT DOCUMENTS

| | | | |
|---|---|---|---|
| 3,953,721 | 8/1976 | Johnston et al. | 364/558 |
| 4,155,411 | 5/1979 | Weaver | 364/567 |
| 4,418,774 | 12/1983 | Whitney et al. | 364/367 |
| 4,446,527 | 5/1984 | Runyan | 364/558 |
| 4,464,725 | 8/1984 | Briefer | 364/567 |
| 4,592,002 | 5/1986 | Bozarth, Jr. et al. | 364/557 |
| 4,598,381 | 7/1986 | Cucci | 364/558 |
| 4,644,482 | 2/1987 | Juanarena | 364/557 |

FOREIGN PATENT DOCUMENTS 58-95220 6/1983 Japan .
59-131131 7/1984 Japan .

Primary Examiner—Gary Chin
Assistant Examiner—V. Trans
Attorney, Agent, or Firm—Senniger, Powers, Leavitt and Roedel

[57] ABSTRACT

A force measuring device, such as a weighing device, having device for automatically compensating for temperature-induced zero and span deviations. The device includes force and temperature sensors for producing force and temperature indicative signals, respectively. Device for processing processes these force and temperature signals at various temperatures in no-load and reference-load conditions by regressive analysis in order to obtain and store in memory equations representing the zero and span deviations with temperature. During use of the force measuring device for measurement, the device uses the stored equations to calculate the zero and span deviations from the current temperature to correct the force indicative signal.

5 Claims, 2 Drawing Sheets

FORCE MEASURING DEVICE

BACKGROUND OF INVENTION

This invention relates to a force measuring device and, more particularly, to a measuring device having means for compensating for zero deviation and/or span deviation attributable to temperature change.

A force measuring device, such as a weigher, for converting a force into a digital electrical signal and processing the signal for display may provide a non-zero value under a no-load condition or an incorrect value under a loaded condition. The former is referred to as "zero deviation" and the latter is referred to as "span deviation", both causing an error of measurement. Although this error can be removed by adjusting the device prior to use, it often appears again with variation of the surrounding temperature. Compensating for this error by using a temperature sensing element such as a thermistor has not been sufficiently successful. The opened Japanese patent specification No. 58-95220 disclosed a device in which a reference weight having a known weight value is actually weighed and a ratio of the weight value to the indicated value is calculated and stored as a correction coefficient, thereby compensating for the span deviation. However, a number of reference weights must be prepared for obtaining high accuracy, since the correction coefficient varies with the load to be measured. It is uneconomical and troublesome to always keep and use such a number of reference weights.

SUMMARY OF INVENTION

Accordingly, an object of this invention is to provide an improved force measuring device having no disadvantage or problem as above-mentioned and enabling compensation for temperature-dependent zero and/or span deviations.

According to this invention, there is provided a force measuring device comprising force sensing means responsive to an applied force for producing a force signal indicative of this force, temperature sensing means responsive to temperature for producing a temperature signal indicative of this temperature, means for receiving various temperature signals and corresponding force signals under no-load condition and producing, by regressive analysis, an equation indicative of the relationship between both signals, means for storing this equation, and means for calculating a zero deviation by using this equation from a current temperature signal under loaded condition, thereby correcting the current force signal.

The force measuring device of this invention may further comprise means for receiving various temperature signals and corresponding force signals under reference loaded condition and producing, by regressive analysis, a second equation indicative of the relationship between both signals, means for storing the second equation, and means for calculating a span deviation by this equation from a current temperature signal under loaded condition, thereby correcting the current force signal.

These and other objects and features of this invention will be described in more detail with reference to the accompanying drawings.

DESCRIPTION OF PREFERRED EMBODIMENTS

Figure 1:
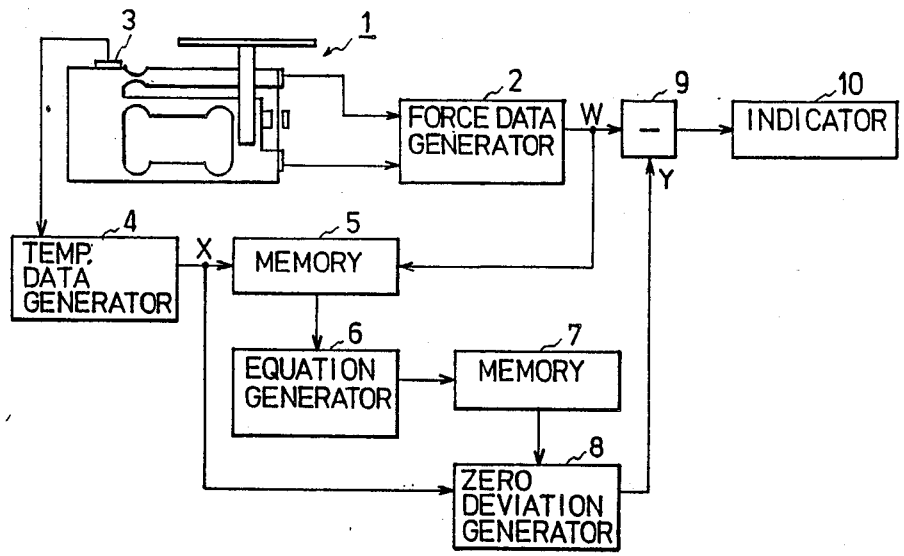
FIG. 1 is a block diagram representing a first embodiment of the force measuring device of this invention.

Referring to FIG. 1, there is shown an embodiment of the force measuring device of this invention as a weighing device. In the drawing, 1 denotes a weighing device using a load cell of vibratory string type and 2 denotes a force data generating circuit for processing an electrical signal from the load cell to product a digital signal W indicative of the applied load or weight. The mechanical and electrical configurations of these components 1 and 2 are disclosed in detail in Japanese opened patent specification No., 59-131131 and have no direct connection to this invention. Therefore, a further description thereof will be omitted.

Reference character 3 denotes a temperature sensitive element such as a thermocouple or thermistor for sensing temperature and providing a temperature indicative electrical signal to a temperature data generating circuit 4 for prossesing this signal to produce a digital signal x indicative of the sensed temperature. The circuit 4 includes an amplifier and an analog-to-digital (A/D) convertor and is well-known in the art. Therefore, no further description will be made thereon.

The output digital signals W and X of both data generators 2 and 4 are stored in a memory 5 for use in determination of an equation for calculating zero deviation as described below.

Figure 2:
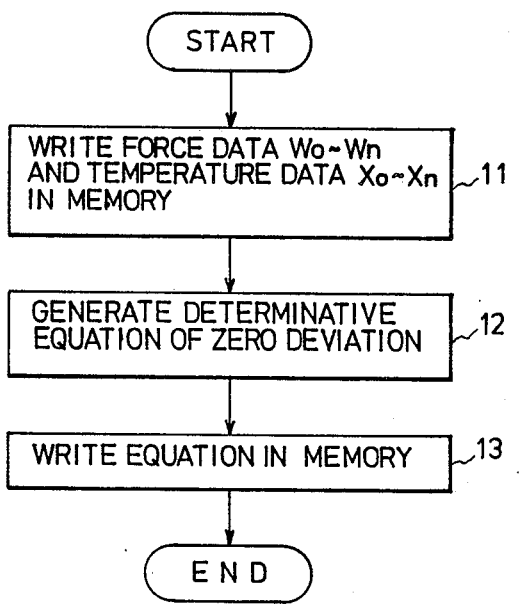
FIG. 2 is a flow chart representing a program for obtaining an equation representing the relationship between zero deviation and temperature data in the first embodiment.

As well-known in the art, zero deviation Y at temperature X is generally given by a quadratic equation $Y = aX^2 + bX + c$. This equation is not completely determinative since the coefficients "a" and "b" and the constant "c" are variant among respective devices. According to this invention, therefore, these values are determined for each device using a technique of regressive analysis. This process will be described below with reference to the flow chart of FIG. 2.

Initially, the device is unloaded and adjusted at a predetermined reference temperature such as 20° C. to indicate zero weight. Thereafter, the surrounding temperature is changed successively within a desired range of use, for example, −10° C. to +40° C. and the weight indicative signals $W_0, W_1, \ldots W_n$ from the force data generator 2 and corresponding temperature indicative signals $X_0, X_1, \ldots X_n$ are stored in the memory 5 in step 11. This weight and temperature data are read out by an equation generator arithmetic 6 and processed as follows.

It is well-known in the field of regressive analysis that the above-mentioned coefficients "a" and "b" and constant "c" are given as follows:

$$a = \frac{S(x^2w)S(xx) - S(xw)S(xx^2)}{S(xx)S(x^2x^2) - [S(xx^2)]^2}$$

$$b = \frac{S(xw)S(x^2x^2) - S(x^2w)S(xx^2)}{S(xx)S(x^2x^2) - [S(xx^2)]^2}$$

$$c = \frac{\sum_{i=0}^{n} W_i}{n} - b \frac{\sum_{i=0}^{n} X_i}{n} - a \frac{\sum_{i=0}^{n} X_i^2}{n}$$

where $$S(xx) = \sum_{i=0}^{n} X_i - \frac{\left(\sum_{i=0}^{n} X_i\right)^2}{n}$$

$$S(xw) = \sum_{i=0}^{n} X_i W_i - \frac{\sum_{i=0}^{n} X_i \cdot \sum_{i=0}^{n} W_i}{n}$$

$$S(xx^2) = \sum_{i=0}^{n} X_i^3 - \frac{\sum_{i=0}^{n} X_i^2 \cdot \sum_{i=0}^{n} W_i}{n}$$

$$S(x^2w) = \sum_{i=0}^{n} X_i^2 W_i - \frac{\sum_{i=0}^{n} X_i^2 \cdot \sum_{i=0}^{n} W_i}{n}$$

$$S(x^2x^2) = \sum_{i=0}^{n} X_i^4 - \frac{\left(\sum_{i=0}^{n} X_i^2\right)^2}{n}$$

These values of "a", "b" and "c" are calculated by step 12 in the equation generator 6. The quadratic equation $aX^2+bX+c$ using the calculated values is stored in another memory 7 by step 13. The memory 5 and equation generator 6 may be included in a microcomputer which is detachably coupled to the data generators 2 and 4 and the second memory 7.

When the device is used for a weighing operation, a zero deviation generator 8 uses a current temperature data X from the temperature data generator 4 in the equation read out from the memory 7 to calculate the value of zero deviation Y at that time. The calculated deviation Y is subtracted from a current force data W in a subtracter 9 and the resultant zero-corrected weight value is indicated by an indicator 10. The memory 7, zero deviation generator 8 and subtracter 9 may be included in a microcomputer.

Figure 3:
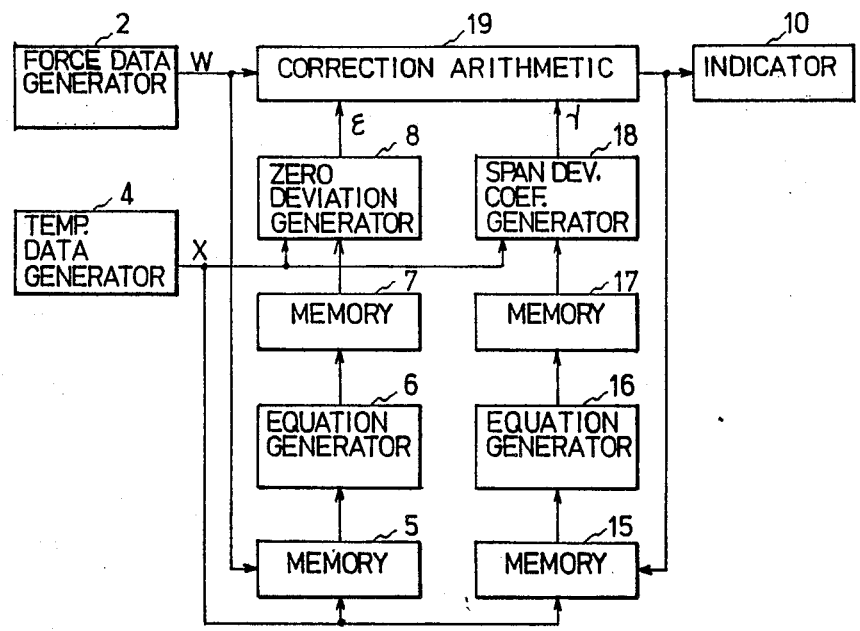
FIG. 3 is a block diagram representing a second embodiment of the force measuring device of this invention.

FIG. 3 shows a second embodiment of this invention, which can compensate not only for zero deviation but also for span deviation. In this embodiment, the components 2 to 8 are identical to those in the first embodiment of FIG. 1. Zero deviation $\epsilon_t$ corresponds to Y at any temperature "t" with respect to predetermined reference temperature and is provided from the zero deviation generator 8 to a correction arithmetic unit 19.

Figure 4:
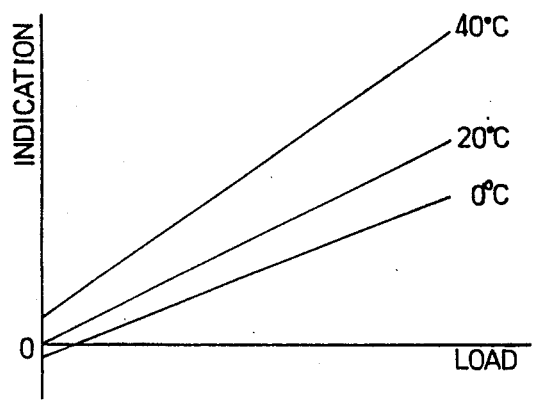
FIG. 4 is a diagram representing a temperature-dependent variation of the relationship between applied load versus its indicated value.

FIG. 4 exaggeratedly shows temperature dependent variation of applied load versus indicated value characteristic, wherein 20° C. is selected as the reference temperature. As shown, both zero and span deviation in a force measuring device vary with temperature. Although the span deviation does not vary with variation of the applied load, it varies linearly with temperature according to the following relationship:

$$\gamma_t = (W_t - W_r)/W_r$$

where $W_t$ and $W_r$ are weight data provided by the data generators 2 at temperature "t" and the reference temperature "r", respectively, and $\gamma_t$ is a constant referred to as "span deviation factor". Therefore, $W_t = W_r(1+\gamma_t)$. Considering both the span deviation and the zero deviation:

$$W_t = W_r(1+\gamma_t) + \epsilon_t$$

Therefore, $$W_r = (W_t - \epsilon_t)/(1+\gamma_t) \tag{1}$$

or $$W_r = (W_t - \epsilon_t)(1-\gamma_t) \text{ when } \gamma_t << 1. \tag{2}$$

Accordingly, if the span deviation factor $\gamma_t$ is known, the zero and span deviations can be compensated for at any temperature using the equation (1) or (2).

Although the span deviation has a linear relationship to the temperature "t", its relation to the temperature data X provided by the temperature data generator 4 is not always linear due to non-linearity of the temperature sensing element which is used. In accordance with this invention, therefore, the span deviation factor $\gamma_t$ is approximated as a quadratic function of the temperature data X as in the first embodiment, for example, $\gamma_t = AX^2 + BX + C$. Then, the values of A, B and C are calculated by regressive analysis as described above in a second equation generator 16. This calculation is identical to that executed in the first equation generator 6 except that the weight data $W_i$ used here are previously zero-corrected in the correction arithmetic 19 and stored in a memory 15 together with the corresponding temperature data $X_i$. The determined equation is stored in a memory 17 and used in a span deviation coefficient generator 18 with the temperature data X from the temperature data generator 4 every weighing operation for calculating the coefficient $\gamma_t$ at current temperature. The calculated span deviation coefficient $\gamma_t$ is applied to the correction arithmetic 19 together with the zero deviation $\epsilon_t$ at the same temperature and used for calculating the zero and span-corrected weight data $W_r$ using the equation (1) or (2) which is previously stored in the unit 19. The corrected data is indicated by the indicator 10. The components 5 to 8 and 15 to 19 may be included in a microcomputer.

Figure 5:
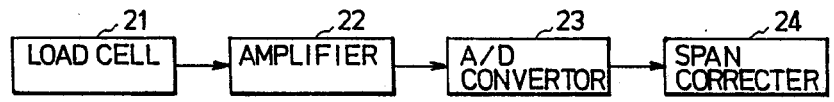
FIG. 5 is a block diagram representing a modified example of the force data generator 2 used in the above embodiments.

The force data generator 2 may be of any configuration which can provide digital data. FIG. 5 shows an example of this configuration in which an analog data from a load cell 21 is amplified by an amplifier 22 and converted into digital form by an A/D convertor 23 and the resultant digital data is applied to a span correction circuit 24 for previously compensating for an inherent span error independet of temperature.

In the above-mentioned embodiment, the span deviation coefficient $\gamma_t$ is defined as $(W_t - W_r)/W_r$. However, it may be defined as $W_t/W_r$. In the latter case, an equation $W_r = (W_t - \epsilon_t)/\gamma_t$ is used in the arithmetic unit 19 instead of Equation (1) or (2).

The relation between the temperature data X and $\epsilon_t$ or $\gamma_t$ may be represented with another equation of higher order. The technique of regressive analysis can be used also in this case as known by those skilled in this field though the analyzing program may differ more or less.

The components 5 and 6 and/or 15 and 16 used for determination of the zero deviation and span deviation factor equations, respectively, become unnecessary after determination of the equations. Therefore, it is preferable to make these components detachable from the device so that they can be used for the same purpose in other devices.

We claim:

1. A force measuring device comprising means for detecting an applied force resulting from a loaded condition of said device to provide force data indicative of said applied force, means for detecting a temperature of said device to provide temperature data indicative of said temperature, and means for compensating for a temperature dependent change of said force data; wherein said compensating means comprising:

first means for receiving said temperature data indicative of various temperatures within a desired temperature range, for receiving said force data corresponding to said various temperatures when said device is in an unloaded condition and for determining, by regressive analysis of said indicative temperature data and said force data, coefficients of a zero deviation equation representing a relationship between said force data when said device is in the unloaded condition and said temperature data;

means for storing said zero deviation equation;

second means for receiving current temperature data when said device is in the loaded condition and for receiving said stored zero deviation equation and for calculating an amount of zero deviation at said current temperature using said stored zero deviation equation;

means for providing said force data at said current temperature representing said applied force resulting from said loaded condition with compensation corresponding to said amount of zero deviation;

third means for receiving said indicative temperature data and said force data corresponding to said various temperatures when the applied force results from a predetermined loaded condition of said device and for determining, by regressive analysis of said indicating temperature data and said force data, a span deviation coefficient equation representing a relationship between a span deviation coefficient of said device in the predetermined loaded condition and said temperature data;

means for storing span deviation coefficient equation;

fourth means for receiving, current temperature data when said device is in a loaded condition and for receiving said stored span deviation coefficient equation and for calculating the span deviation coefficient at said current temperature using said stored span deviation coefficient equation; and wherein said means for providing provides said force data at said current temperature when said device is in said loaded condition with compensation for span deviation using span deviation coefficient in addition to said compensation corresponding to said amount of zero deviation.

2. A device, as set forth in claim 1, wherein said first means is a microprocessor detachably incorporated in said force measuring device.

3. A device, as set forth in claim 1, wherein said third means approximates said span deviation coefficient equation by a quadratic function.

4. A device, as set forth in claim 1, wherein said first means approximates said zero deviation equation by a quadratic function.

5. A device, as set forth in claim 3, wherein said first means approximates said zero deviation equation by a quadratic function.

* * * * *